United States Patent [19]

Voyles et al.

[11] Patent Number: 4,498,117
[45] Date of Patent: Feb. 5, 1985

[54] DIELECTRIC FLUID

[75] Inventors: Gerald A. Voyles; Vandos Shedigian, both of Indianapolis, Ind.

[73] Assignee: Emhart Industries, Inc., Indianapolis, Ind.

[21] Appl. No.: 555,234

[22] Filed: Nov. 25, 1983

Related U.S. Application Data

[63] Continuation of Ser. No. 297,709, Aug. 31, 1981, abandoned.

[51] Int. Cl.³ .......................... H01G 4/22; B05D 5/12
[52] U.S. Cl. .................................... 361/315; 252/567
[58] Field of Search ............... 252/567, 570, 575, 579; 361/311–315, 319, 323, 324, 327; 427/79

[56] References Cited

U.S. PATENT DOCUMENTS 4,190,682 2/1980 Shaw ............................... 252/570 X
4,288,837 9/1981 Nishimatsu et al. ............ 361/319 X
4,381,535 4/1983 Shedigian et al. .............. 252/567 X

OTHER PUBLICATIONS

Conference: Proceedings of the American Power Conference, vol. 39, Chicago, Ill., U.S.A., Apr. 18–20, 1977, pp. 1043–1051, Wemcol Capacitor Fluid Development.

Primary Examiner—Donald A. Griffin
Attorney, Agent, or Firm—Robert F. Meyer

[57] ABSTRACT

A dielectric fluid for a capacitor includes a mixture of a phthalate ester and an alkylated napthalene.

6 Claims, 3 Drawing Figures

DIELECTRIC FLUID

This application is a continuation of application Ser. No. 06/297,709, filed 8/31/81 now abandoned.

BACKGROUND OF THE INVENTION

1. Field of the Invention

The present invention generally relates to dielectric fluids used in capacitors and, in particular, to such fluids which include dioctyl phthalate.

2. Statement of the Prior Art

In the manufacturing of high voltage capacitors such as those used in appliances like microwave ovens, the selection of the dielectric fluid has a substantial influence on the electrical characteristics of the capacitor. Voltages, in such applications are commonly within the range of 1000 to 2500 volts. Therefore, it is necessary that the dielectric fluid have a relatively high corona start voltage and a relatively high corona extinguish voltage. The dielectric fluid should further have as high a dielectric constant as practical in order to provide volumetric efficiency to the capacitor. Physically, the fluid must have a relatively low viscosity to enable it to permeate the capacitor winding and fill the voids between the electrodes and the dielectric material. The fluid should also be refinable to achieve low losses in the dielectric during operation. For many years, polychlorinated biphenyls, hereinafter PCBs, have been used as at least part of dielectric fluids because of their ability to satisfy the above requirements. However, since the banning of PCB use, suitable substitutes have been sought and the above problems have had to be readdressed. Difficulty is encountered, however, in finding fluids which have comparable performance characteristics to meet the above requirements.

One material which has met with some success in meeting these requirements is a phthalate ester called dioctyl phthalate, or more specifically, 2-ethyl hexyl phthalate (hereinafter DOP). As per the present invention, it has been found that the performance characteristics of capacitors using DOP as the dielectric fluid can be improved in high voltage applications.

SUMMARY OF THE INVENTION

Accordingly, the present invention provides a dielectric fluid for a capacitor including a mixture of a phthalate ester and an alkylated naphthalene.

BRIEF DESCRIPTION OF THE DRAWINGS

The present invention is illustratively described in respect to the appended drawings in which.

DETAILED DESCRIPTION OF THE DRAWNGS

Figure 1:
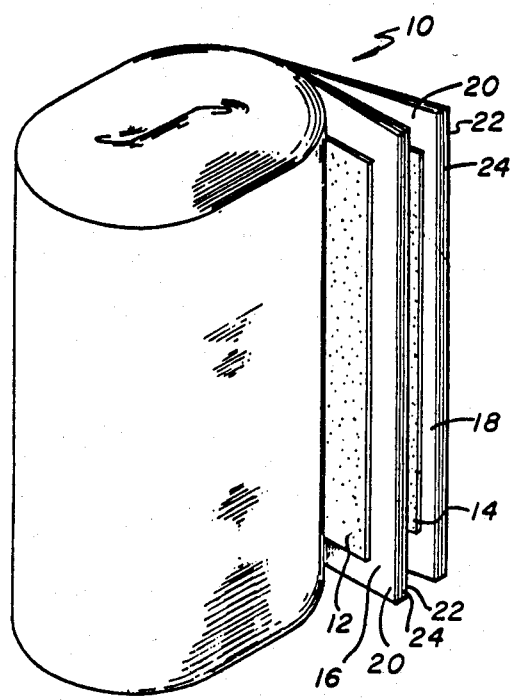
FIG. 1 is a perspective view of the electrode-dielectric body of a convolutely wound capacitor constructed according to an embodiment of the present invention.

FIG. 1 shows the convolutely wound electrodes of a high voltage dielectric capacitor constructed according to one embodiment of the present invention. The capacitor body 10 includes a pair of electrodes 12 and 14 which are separated by a pair of dielectric separators 16 and 18. The electrodes 12 and 14 may be made of any suitable electrically conductive metal such as aluminum. The dielectric means, or separators 16 and 18, used in high voltage capacitors and for the present invention each includes a pair of sheets of plastic film 20 and 22 which are separated by a sheet of paper 24. The plastic film is typically a polymeric film which may be selected from the group consisting of polypropylene, polyethylene, polyester, polycarbonate, polystyrene, polysulfone and polyethylene terephthalate. Other suitable arrangements may also be used in place of that of the present invention. Such arrangements might include the same materials but different combinations of dielectric sheets. Examples are a combination of single sheets of paper and plastic film or the combination of two sheets of paper and a single sheet of plastic film.

Figure 2:
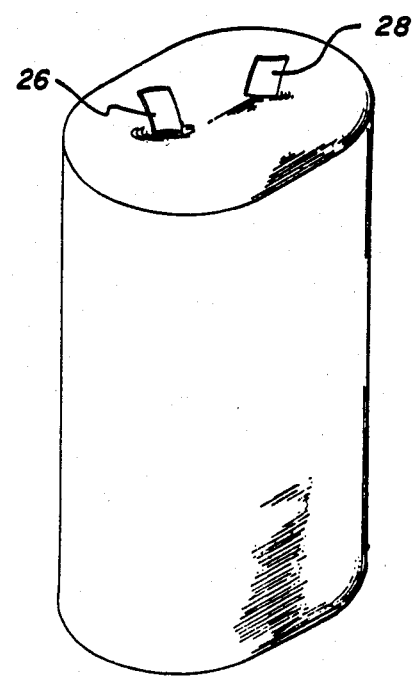
FIG. 2 is a perspective view of the embodiment of FIG. 1 wherein the coils are completely wound and electrical leads are attached to the electrodes.

FIG. 2 shows the electrode body 10 of FIG. 1 with the electrodes completely wound and with a pair of electrical leads 26 and 28, each of which is connected to a separate electrode such as 12 and 14, respectively. The leads 26 and 28 may be made of any suitable material such as solder coated copper.

Figure 3:
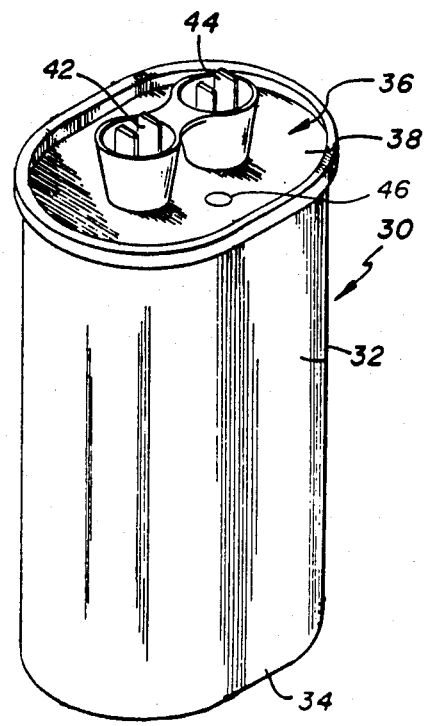
FIG. 3 is a perspective view of the embodiments of FIGS. 1 and 2 after being packaged in a suitable capacitor casing.

FIG. 3 shows a completed capacitor 30 having a housing or can 32 enclosing the electrode body 10. The housing 32 has a closed end 34 and an open end 36 through which the capacitor body 10 is inserted during manufacturing. A cover 38 encloses the end 36 and includes a pair of electrical terminals 42 and 44 which are connected to the leads 26 and 28, respectively, from the electrodes 12 and 14. Any suitable material may be used for the housing 32 and cover 36, such as aluminum, with proper precautions being taken to prevent shorting of either the electrodes 12, 14, leads 26, 28 or terminals 42, 44 thereto.

In the manufacturing of the capacitor 10, electrodes 12 and 14, with electrical leads 26 and 28, are first assembled with the dielectric means or separators 16 and 18 in a stacked fashion. The stack is then rolled to form the capacitor body shown in FIG. 2, and the body is inserted into a housing 34. At this point, the electrical leads 26 and 28 are connected to terminals 42 and 44 on the cover 38. The cover 38 is then attached to the housing 32 and sealed by any suitable means such as welding. The cover 38 also includes an opening or hole 46 to allow the ingress and egress of gasses and liquids. The housing 34 is then placed in a vacuum oven and heat dried for an extended period of time which in most cases would probably be a minimum of at least eight hours. This is needed to drive contaminants such as water from the capacitor body. At this point in the manufacturing process, a dielectric fluid is added under vacuum.

The dielectric fluid which is added and which concerns the present invention is a mixture of a phthalate ester and an alkylated napthalene. The phthalate ester is 2-ethyl-hexyl phthalate or dioctyl phthalate or DOP. The preferred form of alkylated napthalene is isopropyl napthalene (hereinafter IPN). IPN should be included in the dielectric fluid in an amount between 30 and 40% by volume. The preferred ratio by volume is 30% isopropyl napthalene to 70% dioctyl phthalate. This mixture results in a dielectric fluid having a practical dielectric constant for volumetric efficiency and a practical overall viscosity for absorption of the fluid into the capacitor roll. Also, the addition of IPN to DOP improves the resulting corona start voltage and corona extinguish voltage as well as the aromaticity over those of unblended DOP. IPN also tends to improve the gas absorption ability of DOP.

After blending, the dielectric fluid is refined to remove water and ionic impurities by passing it through a chromatographic column using aluminum oxide or Fuller's earth or layers of both and placed in a vacuum over for drying. The refined fluid is then introduced into the capacitor shown in FIG. 3 under heat and pressure by submerging the capacitor in the fluid in an evacuated oven. Repetitive pressurizations of the oven to atmospheric pressure and reestablishment of the vacuum can be used to force the dielectric fluid into the capacitor body and its plastic dielectric film. The hole 46 is then typically sealed with solder to complete the manufacturing process.

The table below displays the fluid properties of DOP and IPN alone and in combination at the preferred ratio.

| FLUID | DOP | IPN* | DOP + IPN |
|---|---|---|---|
| PROPERTIES | | | 70 + 30 |
| Dielectric Constant (25° C.) | 5.0 | 2.6 | 4.5 |
| Viscosity-CS (25° C.) | 62 | 10. | 32 |
| Specific Gravity (25° C.) | 0.983 | 0.933 | 0.977 |
| % Aromaticity | 25 | 80 | 42 |
| ELECTRICAL PROPERTIES OF CAPACITORS | | | |
| Capacity after Impregnation-uF | 0.87 | — | 0.86 |
| Corona Start Voltage (CSV)-Volts | 500 | — | 3500 |
| Corona Extinguish Voltage (CEV)-Volts | 100 | — | 1600 |

The table displays the previously mentioned qualities of the preferred fluid blend. The dielectric constant is a practical value for volumetric efficiency. The viscosity is also sufficiently low to avoid problems in saturating the capacitor roll with the fluid. The resulting electrical characteristics of a typical capacitor are improved over pure DOP in both the corona start and corona extinguish voltages.

The above description of the present invention is intended to be taken in an illustrative and not a limiting sense, and various modifications and changes may be made to the described embodiments by persons skilled in the art without departing from the scope of the appended claims.

What is claimed is:

1. In a capacitor, a dielectric fluid including a mixture of a phthalate ester and isopropyl napthalene in an amount which is between 30% and 40% of said dielectric fluid by volume.

2. The dielectric fluid of claim 1 wherein said phthalate ester includes dioctyl phthalate.

3. The dielectric fluid of claim 2 wherein said dioctyl phthalate and said isopropyl napthalene are included in a percent by volume mixture of substantially 70 and 30, respectively.

4. A capacitor comprising a pair of electrically conductive electrodes and a dielectric means separating said electrodes, said dielectric means including a plastic film and the dielectric fluid of claim 1.

5. The capacitor of claim 4, wherein said plastic film is selected from the group consisting of polypropylene, polyethylene, polyester, polycarbonate, polystyrene, polysulfone and polyethylene terephthalate.

6. The capacitor of claim 5, wherein said electrodes are convolutely wound and said dielectric means includes two dielectric separators for separating said pair of electrodes when wound, each said separator including a pair of sheets of said plastic film separated by a sheet of paper.

* * * * *